United States Patent
Pao et al.

(10) Patent No.: US 11,212,057 B2
(45) Date of Patent: Dec. 28, 2021

(54) DEVICE AND METHOD FOR HANDLING PHYSICAL DOWNLINK SHARED CHANNELS IN BANDWIDTH PARTS

(71) Applicant: ACER INCORPORATED, New Taipei (TW)

(72) Inventors: Wei-Chen Pao, New Taipei (TW); Chien-Min Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/440,958

(22) Filed: Jun. 13, 2019

(65) Prior Publication Data
US 2019/0386804 A1 Dec. 19, 2019

Related U.S. Application Data

(60) Provisional application No. 62/685,293, filed on Jun. 15, 2018.

(51) Int. Cl.
| | |
|---|---|
| *H04L 5/00* | (2006.01) |
| *H04L 1/18* | (2006.01) |
| *H04W 72/04* | (2009.01) |

(52) U.S. Cl.
CPC .......... *H04L 5/0055* (2013.01); *H04L 1/1812* (2013.01); *H04L 5/0053* (2013.01); *H04W 72/042* (2013.01)

(58) Field of Classification Search
CPC ... H04L 5/0055; H04L 1/1812; H04L 1/1822; H04L 1/1896; H04L 1/1854; H04L 1/1887; H04W 72/042
See application file for complete search history.

(56) References Cited

U.S. PATENT DOCUMENTS

| | | | |
|---|---|---|---|
| 8,995,376 B2* | 3/2015 | Pan | H04L 5/0094 370/329 |
| 2018/0343154 A1 | 11/2018 | Park | |
| 2019/0174466 A1 | 6/2019 | Zhang | |
| 2019/0273637 A1 | 9/2019 | Zhang | |
| 2019/0313429 A1 | 10/2019 | Cheng | |
| 2019/0313437 A1 | 10/2019 | Jung | |
| 2019/0313440 A1* | 10/2019 | Wilson | H04L 27/2666 |

(Continued)

OTHER PUBLICATIONS

Mediatek Inc., Remaining Issues on Beam Management, 3GPP TSG RAN WG1 Meeting #93, Busan Korea, May 21-25, 2018, R1-1806788, XP051441990.

QUALCOMM Incorporated, Remaining Details on QCL, 3GPP TSG-RAN WG1 Meeting #93, Busan, Korea, May 21-25, 2018, pp. 1-10, R1-1807398, Revision of R1-1807351, XP051442590.

(Continued)

*Primary Examiner* — Mounir Moutaouakil
(74) *Attorney, Agent, or Firm* — JCIPRNET

(57) ABSTRACT

A communication device for handling a plurality of physical downlink (DL) shared channels (PDSCHs) in a plurality of bandwidth parts (BWPs) comprises at least one storage device; and at least one processing circuit, coupled to the at least one storage device. The at least one storage device stores instructions, and the at least one processing circuit is configured to execute the instructions of: receiving a first PDSCH in a first BWP in a time period from a network; receiving a second PDSCH in a second BWP in the time period from the network, wherein the first PDSCH is corresponding to a first processing priority and the second PDSCH is corresponding to a second processing priority; and processing the second PDSCH according to the second processing priority.

23 Claims, 9 Drawing Sheets

(56) References Cited

U.S. PATENT DOCUMENTS

| | | | | |
|---|---|---|---|---|
| 2019/0349149 | A1* | 11/2019 | Nam | H04L 5/0007 |
| 2019/0357215 | A1* | 11/2019 | Zhou | H04L 5/0053 |
| 2019/0363840 | A1* | 11/2019 | Wang | H04L 1/1861 |
| 2019/0363843 | A1* | 11/2019 | Gordaychik | H04L 1/0013 |
| 2020/0077432 | A1 | 3/2020 | Xiong | |
| 2020/0213058 | A1* | 7/2020 | Choi | H04B 7/0695 |

OTHER PUBLICATIONS

Ericsson, Feature lead summary 2 for beam measurement and reporting, 3GPP TSG-RAN WG1 Meeting #93, Busan, May 21-25, 2018, p. 1/35-35/35, R1-1807679, XP051463308.

3rd Generation Partnership Project; Technical Specification Group Radio Access Network; NR; Physical layer procedures for control (Release 15), Technical Specification, 2017-12, pp. 1-56, 3GPP TS 38.213, V2.0.0, 3GPP Organizational Partners(ARIB, ATIS, CCSA, ETSI, TSDSI, TTA, TTC), XP051364819, Dec. 2017.

Nokia, Nokia Shanghai Bell, Remaining details on multi-TRP transmission, 3GPP TSG RAN WG1 NR Ad Hoc #3, Nagoya, Japan, Sep. 18-21, 2017, R1-1716494, XP051339947.

LG Electronics, Discussion on cooperative transmission, 3GPP TSG RAN WG1 Meeting #90, Prague, Czech Republic, Aug. 21-25, 2017, pp. 1-4, R1-1713139, XP051315948.

Huawei, Hisilicon, Remaining issues on scheduling and HARQ, 3GPP TSG RAN WG1 Meeting #93, R1-1805888, May 21-25, 2018, Busan, Korea, XP051441107.

QUALCOMM Incorporated, Summary of DL/UL scheduling and HARQ management, 3GPP TSG-RAN WG1 Meeting AH 1801, R1-1803470, Feb. 26-Mar. 2, 2018, pp. 1-23, Athens, Greece, XP051398767.

QUALCOMM Incorporated, Remaining Issues on DL/UL scheduling, Processing Time and HARQ management, 3GPP TSG-RAN WG1 Meeting #92, 1802842, Feb. 26-Mar. 2, 2018, pp. 1-11, Athens, Greece, XP051398255.

Samsung, Corrections on HARQ management and Feedback, 3GPP TSG RAN WG1 Meeting #93, R1-1806738, May 21-25, 2018, pp. 1-4, Busan, Korea, XP051441940.

LG Electronics Inc., "Summary of E-mail discussion on [99bis#43] [NRUP/MAC] Impact of BWP", 3GPP TSG-RAN WG2 Meeting #100, R2-1713879, Nov. 17, 2017, pp. 1-35.

"Office Action of Europe Counterpart Application", dated Nov. 4, 2020, p. 1-p. 8.

* cited by examiner

| Priority bits | Priorities (e.g., high to low) |
|---|---|
| 00 | {BWP1, BWP2, BWP3, BWP4} |
| 01 | {BWP4, BWP3, BWP2, BWP1} |
| 10 | {BWP3, BWP1, BWP4, BWP2} |
| 11 | {BWP1, BWP4, BWP3, BWP2} |

DEVICE AND METHOD FOR HANDLING PHYSICAL DOWNLINK SHARED CHANNELS IN BANDWIDTH PARTS

CROSS REFERENCE TO RELATED APPLICATIONS

This application claims the benefit of U.S. Provisional Application No. 62/685,293 filed on Jun. 15, 2018, which is incorporated herein by reference.

BACKGROUND OF THE INVENTION

1. Field of the Invention

The present invention relates to a device and a method used in a wireless communication system, and more particularly, to a device and a method of handling physical downlink shared channels in bandwidth parts.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1x standard or later versions.

According to developments of the 3GPP standard, there may be multiple bandwidth parts (BWPs). The eNB may transmit multiple physical downlink (DL) shared channels in one or more BWPs. The UE may not be able to process the PDSCHs timely due to a capability of the UE. However, operations regarding processing the PDSCHs in the one or more BWPs are still unknown. The UE cannot communicate with the eNB regularly if an agreement regarding the PDSCHs is not defined. Thus, how to process the PDSCHs to communicate with the eNB properly is an important problem to be solved.

SUMMARY OF THE INVENTION

The present invention therefore provides a device and method for handling a plurality of physical downlink (DL) shared channels (PDSCHs) in a plurality of bandwidth parts (BWPs) to solve the abovementioned problem.

A communication device for handling a plurality of physical downlink (DL) shared channels (PDSCHs) in a plurality of bandwidth parts (BWPs) comprises at least one storage device; and at least one processing circuit, coupled to the at least one storage device. The at least one storage device stores instructions, and the at least one processing circuit is configured to execute the instructions of: receiving a first PDSCH in a first BWP in a time period from a network; receiving a second PDSCH in a second BWP in the time period from the network, wherein the first PDSCH is corresponding to a first processing priority and the second PDSCH is corresponding to a second processing priority; and processing the second PDSCH according to the second processing priority; wherein a first hybrid automatic repeat request (HARQ) timing of the first PDSCH is later than a second HARQ timing of the second PDSCH.

A communication device for handling a plurality of physical downlink (DL) shared channels (PDSCHs) in a plurality of bandwidth parts (BWPs) comprises at least one storage device; and at least one processing circuit, coupled to the at least one storage device. The at least one storage device stores instructions, and the at least one processing circuit is configured to execute the instructions of: receiving a first PDSCH in a first BWP in a time period from a network; receiving a second PDSCH in a second BWP in the time period from the network, wherein a first hybrid automatic repeat request (HARQ) timing of the first PDSCH is later than a second HARQ timing of the second PDSCH; and transmitting a first HARQ corresponding to the first PDSCH and a second HARQ corresponding to the second PDSCH to the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
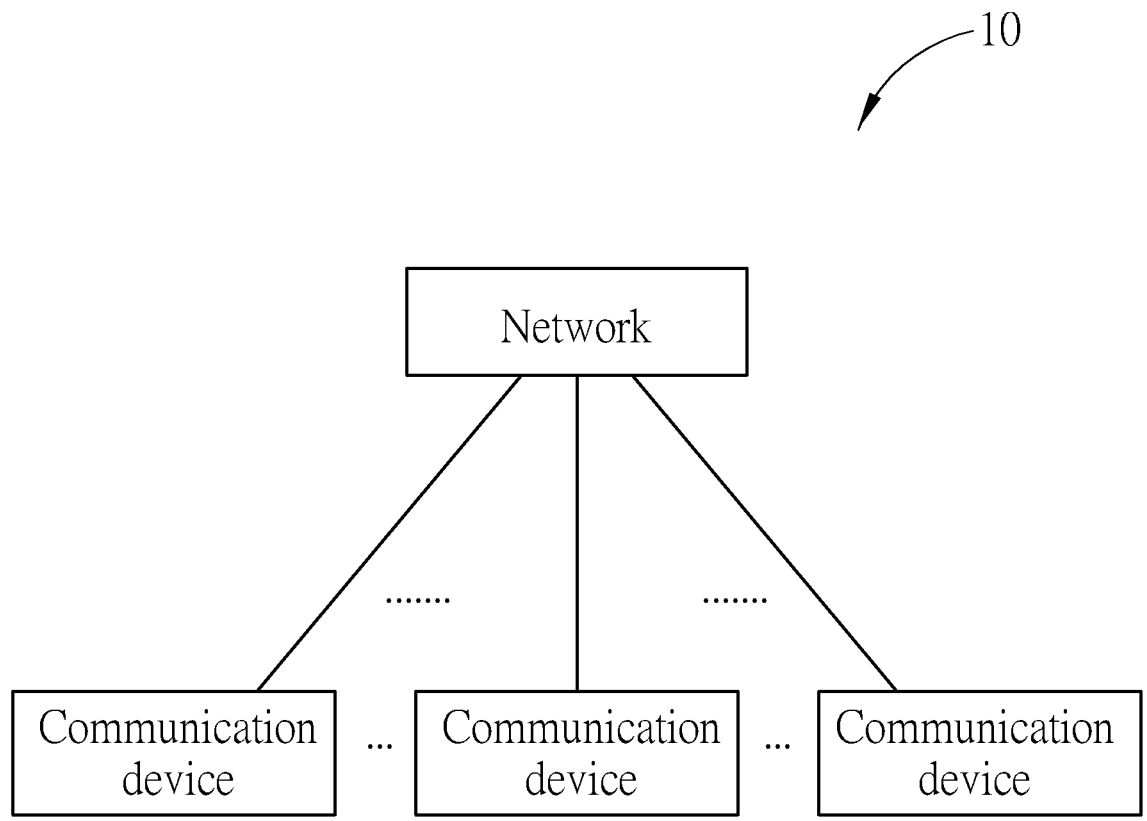
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NG-RAN) including at least one next generation Node-B (gNB) and/or at least one fifth generation (5G) base station (BS). In one example, the network may be any BS conforming to a specific communication standard to communicate with a communication device.

A new radio (NR) is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher security and a low latency. The examples of the applications include an industrial internet, smart grids, infrastructure protection, remote surgery and an intelligent transportation system (ITS). The mMTC is able to support internet-of-things (IoT) of the 5G system which mat billions of connected devices and/or sensors.

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
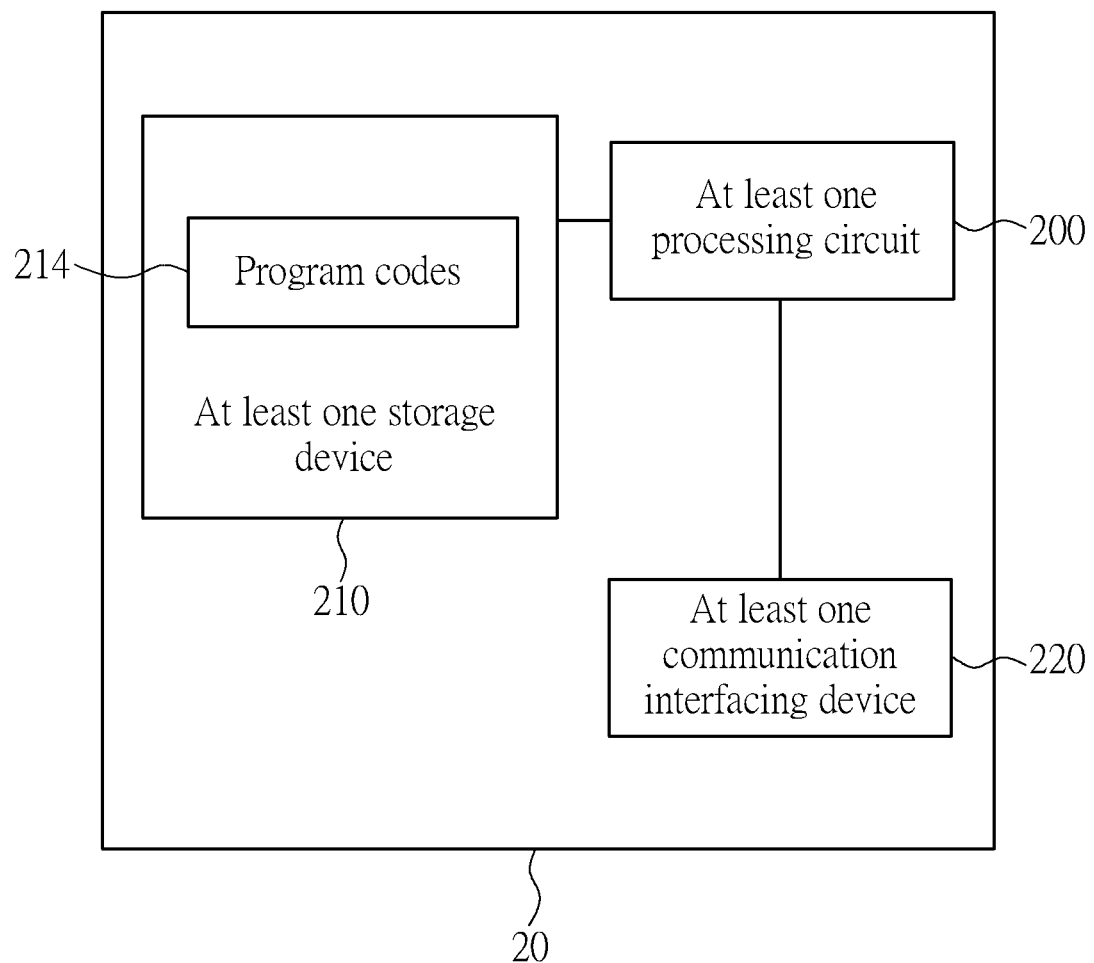
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
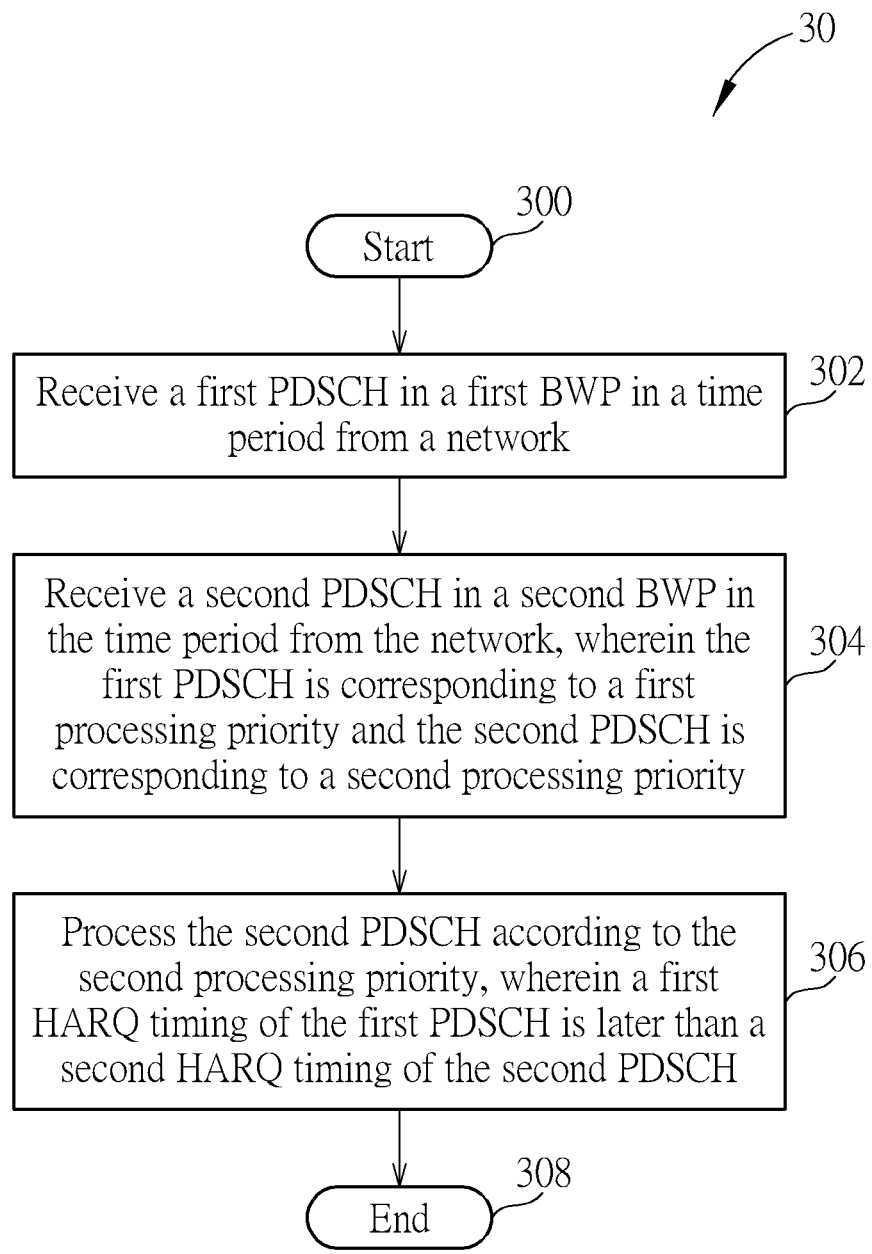
FIG. 3 is a flowchart of a process according to an example of the present invention.

FIG. 3 is a flowchart of a process 30 according to an example of the present invention. The process 30 may be utilized in a communication device, to handle a plurality of physical DL shared channels (PDSCHs) in a plurality of bandwidth parts (BWPs) (e.g., active BWPs). The process 30 may be compiled into the program codes 214 and includes the following steps:

Step 300: Start.

Step 302: Receive a first PDSCH in a first BWP in a time period from a network.

Step 304: Receive a second PDSCH in a second BWP in the time period from the network, wherein the first PDSCH is corresponding to a first processing priority and the second PDSCH is corresponding to a second processing priority.

Step 306: Process the second PDSCH according to the second processing priority, wherein a first hybrid automatic repeat request (HARQ) timing of the first PDSCH is later than a second HARQ timing of the second PDSCH.

Step 308: End.

According to the process 30, the communication device receives a first PDSCH in a first BWP in a time period from a network, and receives a second PDSCH in a second BWP in the time period from the network, wherein the first PDSCH is corresponding to a first processing priority and the second PDSCH is corresponding to a second processing priority. Then, the communication device processes (e.g., detects, decodes and/or responds) the second PDSCH according to the second processing priority. A first HARQ timing of the first PDSCH is later than a second HARQ timing of the second PDSCH. That is, the PDSCHs in the BWPs are processed based on the priorities of the PDSCHs. Thus, the problem that the communication device can only handle one BWP is solved.

Realization of the process 30 is not limited to the above description. The following examples may be applied for realizing the process 30.

The first PDSCH and the second PDSCH may be transmitted in several ways. In one example, a first time interval of the first PDSCH and a second time interval of the second PDSCH are overlapped in the time period. In one example, a first time interval of the first PDSCH and a second time interval of the second PDSCH are not overlapped in the time period. For example, an ending boundary of the first time interval may locate near (e.g., the same as) a starting boundary of the second time interval. For example, the starting boundary of the second time interval may start earlier than the ending boundary of the first time interval. In one example, the second PDSCH is received after the first PDSCH. In one example, the first BWP and the second BWP are a same BWP.

In one example, a processing procedure time (e.g., with a unit of symbols) of the second PDSCH is determined according to (e.g., proportional to) a processing procedure time of a user equipment (UE) capability of the communication device and/or a non-negative timing offset (e.g., a time slot, a plurality of OFDM symbol durations, etc., due to a service interruption, an internal signalling, a data storage, etc.). The non-negative timing offset may be related to the UE capability. The non-negative timing offset may be seen as a buffer period for the communication device to stop processing the first PDSCH and to switch to process the second PDSCH. A processing procedure time of a PDSCH may be defined as a time length (e.g., needed) for processing the PDSCH to feed back a HARQ the PDSCH. The processing procedure times of the first PDSCH and the second PDSCH may be the same or different.

The first processing priority and the second processing priority may be related to (e.g., determined/obtained according to) various factors.

In one example, the first processing priority is related to the first HARQ timing of the first PDSCH, and the second processing priority is related to the second HARQ timing of the second PDSCH. In one example, the communication device stops processing the first PDSCH, if the first HARQ timing is not greater than a first threshold value and the second HARQ timing is greater than a second threshold value. In one example, the communication device processes the first PDSCH, if the first HARQ timing is greater than a first threshold value and the second HARQ timing is greater than a second threshold value. In the above examples, the first threshold value (the second threshold value) may be related to (e.g., determined/obtained according to) various factors. In one example, the first threshold value (the second threshold value) may be determined according to at least one of the following factors: resource of the first PDSCH with the first processing priority (e.g., the number of OFDM symbols for the first PDSCH, the number of OFDM symbols for a DMRS, the last symbol of the first PDSCH, a transport block size (TBS), etc.), resource of the second PDSCH with the second processing priority (e.g., the number of OFDM symbols for the second PDSCH, the number of OFDM symbols for a DMRS, the last symbol of the second PDSCH, a TBS, etc.), a distance of between the last (and/or first) symbols of the first PDSCH and the second PDSCH, and a value which may be fixed or determined according to, e.g., a UE capability. In one example, the first threshold value and the second threshold value may be determined in terms of the same or different OFDM symbol durations.

In one example, the communication device determines whether to process the first PDSCH according to a UE capability of the communication device. In one example, the communication device stops processing the first PDSCH according to the UE capability, if the UE capability does not supports a parallel processing, e.g., the communication device is not able to perform the parallel processing. In one example, the communication device processes the first PDSCH according to the UE capability, if the UE capability supports the parallel processing, e.g., the communication device is able to perform the parallel processing.

In one example, the communication device determines whether to process the first PDSCH according a TBS of the first PDSCH of the communication device. In one example, the communication device processes the first PDSCH, if the TBS of the first PDSCH is greater than a threshold value. In one example, the threshold value may be determined in terms of bits.

In one example, the first processing priority and the second processing priority are related to a first subcarrier spacing of the first BWP and a second subcarrier spacing of the second BWP. In one example, the first processing priority is higher than the second processing priority, if the first subcarrier spacing is greater than the second subcarrier spacing.

In one example, the first processing priority and the second processing priority are related to a BWP configuration of the first BWP and the second BWP. In one example, the first processing priority and the second processing priority are related to a DL control information (DCI) command transmitted by the network. In one example, the first processing priority and the second processing priority are related to a first BWP identity (ID) of the first BWP and a second BWP ID of the second BWP. In one example, the first processing priority and the second processing priority are related to processing procedure times of the first PDSCH and the second PDSCH.

In one example, the UE capability supports a parallel processing, and the communication device may stop processing a PDSCH (e.g., the first PDSCH or the second PDSCH) if a HARQ timing (e.g., corresponding to the first HARQ timing or the second HARQ timing) is not greater than a threshold value (e.g., corresponding to the first PDSCH or the second PDSCH). In one example, the UE capability supports the parallel processing, and the communication device may process a PDSCH (e.g., the first PDSCH or the second PDSCH) if a HARQ timing (e.g., corresponding to the first HARQ timing or the second HARQ timing) is greater than a threshold value (e.g., corresponding to the first PDSCH or the second PDSCH).

Figure 4:
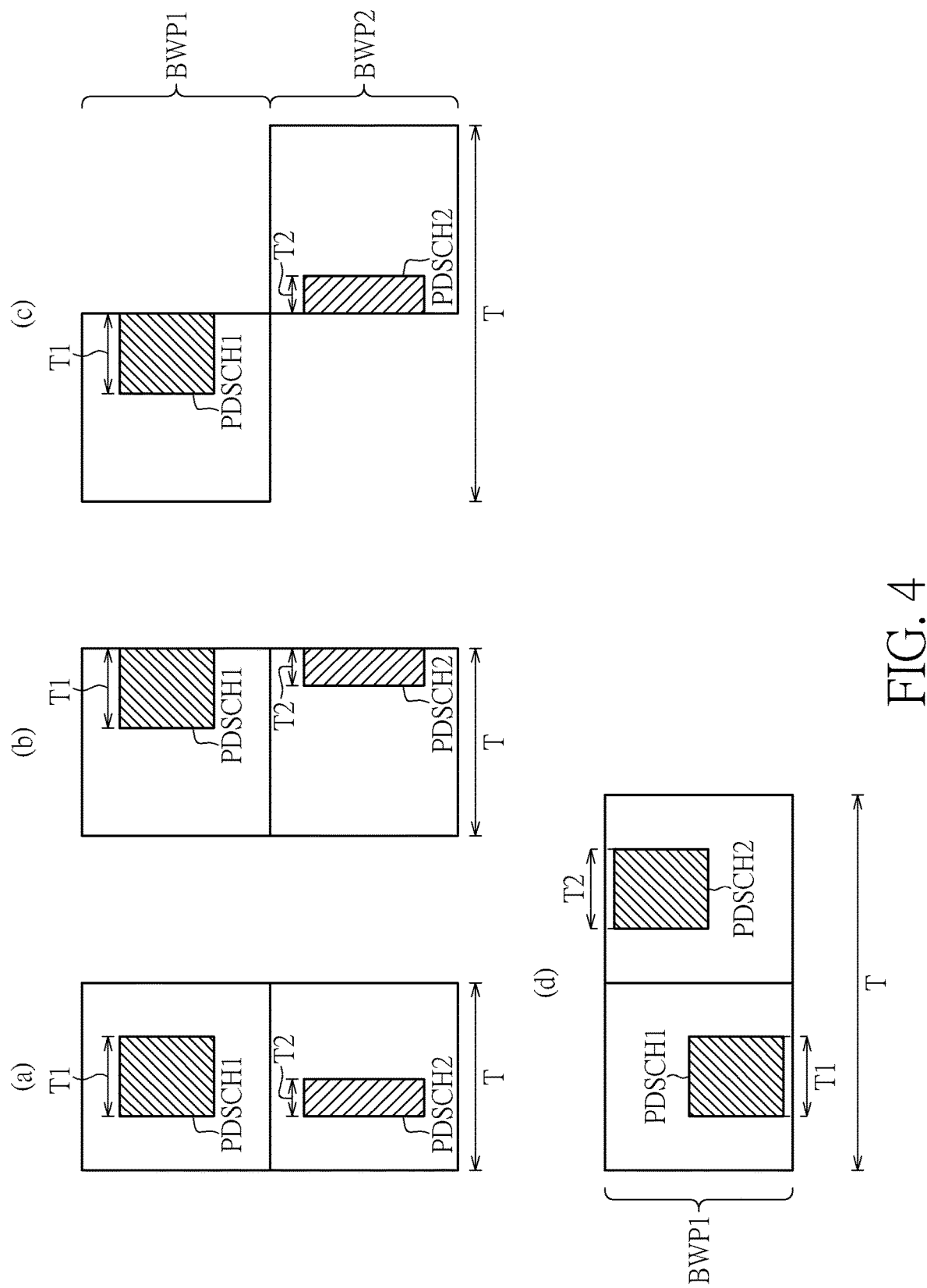
FIG. 4 is a schematic diagram of PDSCHs in BWPs according to an example of the present invention.

FIG. 4 is a schematic diagram of PDSCHs in BWPs according to an example of the present invention. There are PDSCHs PDSCH1-PDSCH2 and BWPs BWP1-BWP2 in the present example. Four cases (a)-(d) with a time period T are used for illustrating possible scenarios of the present invention, but are not limited herein. The PDSCHs PDSCH1-PDSCH2 are transmitted during time intervals T1-T2, respectively. In the case (a), the PDSCHs PDSCH1-PDSCH2 are transmitted in the BWPs BWP1-BWP2, respectively. A starting boundary of the time interval T1 locates near (e.g., the same as) a starting boundary of the time interval T2. In the case (b), the PDSCHs PDSCH1-PDSCH2 are transmitted in the BWPs BWP1-BWP2, respectively. An ending boundary of the time interval T1 locates near (e.g., the same as) an ending boundary of the time interval T2. In the case (c), the PDSCHs PDSCH1-PDSCH2 are transmitted in the BWPs BWP1-BWP2, respectively. An ending boundary of the time interval T1 locates near (e.g., the same as) a starting boundary of the time interval T2. In the case (d), the PDSCHs PDSCH1-PDSCH2 are transmitted in the BWP BWP1. The time intervals T1-T2 are not overlapped, while locations of the PDSCHs PDSCH1-PDSCH2 in a frequency domain are different.

Figure 5:
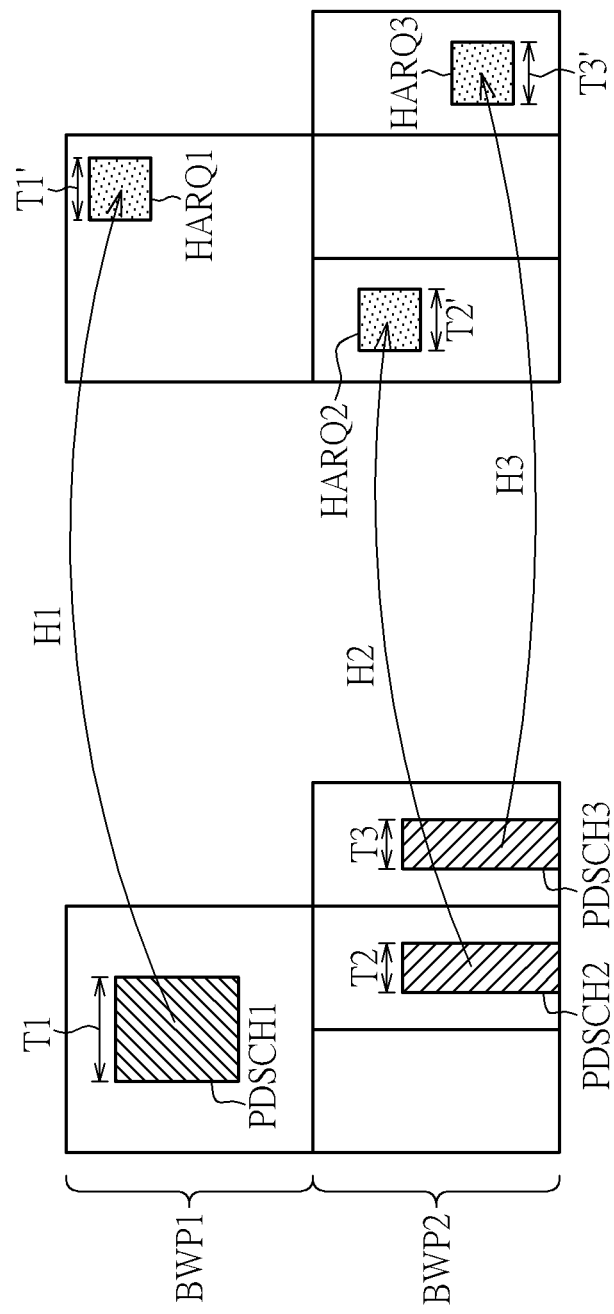
FIG. 5 is a schematic diagram of PDSCHs and corresponding HARQs in BWPs according to an example of the present invention.

FIG. 5 is a schematic diagram of PDSCHs and corresponding HARQs in BWPs according to an example of the present invention. There are PDSCHs PDSCH1-PDSCH3, HARQs HARQ1-HARQ3 of the PDSCHs PDSCH1-PDSCH3 and BWPs BWP1 and BWP2 in the present example. The communication device processes the PDSCHs PDSCH1-PDSCH3 to obtain the HARQs HARQ1-HARQ3, respectively. The PDSCHs PDSCH1-PDSCH3 are transmitted during time intervals T1-T3, respectively. The HARQs HARQ1-HARQ3 are transmitted during time intervals T1'-T3', respectively. The BWPS BWP1-BWP2 may be configured with subcarrier spacings of 15 KHz and 30 KHz, respectively. Processing procedure times of the PDSCHs PDSCH1-PDSCH3 are H1-H3, respectively, and a relation between the time intervals H1-H3 is H2<H1<H3. Thus, the communication device processes the PDSCHs PDSCH2, PDSCH1 and PDSCH3 sequentially, e.g., feeds back the HARQs HARQ2, HARQ1 and HARQ3 sequentially, according to the processing procedure times H1-H3. In one example, the communication device processes the PDSCHs PDSCH1-PDSCH3 based on scheduled timings (e.g., time-domain positions in FIG. 5) of the HARQs HARQ1-HARQ3, wherein an order of the scheduled timings is HARQ2>HARQ1>HARQ3. Thus, the communication device processes the PDSCHs PDSCH2, PDSCH1 and PDSCH3 sequentially, e.g., feeds back the HARQs HARQ2, HARQ1 and HARQ3 sequentially.

Figure 6:
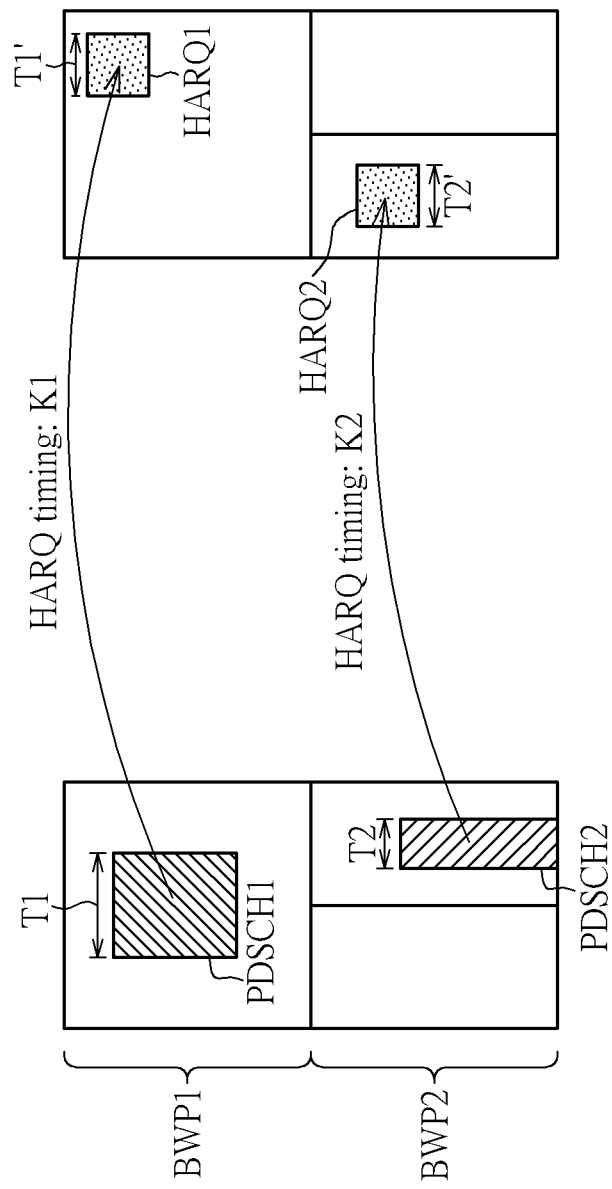
FIG. 6 is a schematic diagram of PDSCHs and corresponding HARQs in BWPs according to an example of the present invention.

FIG. 6 is a schematic diagram of PDSCHs and corresponding HARQs in BWPs according to an example of the present invention. There are PDSCHs PDSCH1-PDSCH2, HARQs HARQ1-HARQ2 of the PDSCHs PDSCH1-PDSCH2 and BWPs BWP1-BWP2 in the present example. The PDSCHs PDSCH1-PDSCH2 are transmitted during time intervals T1-T2, respectively. The HARQs HARQ1-HARQ2 are transmitted during time intervals T1'-T2', respectively. The BWPS BWP1-BWP2 may be configured with subcarrier spacings of 15 KHz and 30 KHz, respectively. HARQ timings of the HARQs HARQ1-HARQ2 are K1-K2, respectively, and a relation between the HARQ timings K1-K2 is K1>K2. Thus, the communication device processes the PDSCHs PDSCH2 and PDSCH1 sequentially, e.g., feeds back the HARQs HARQ2 and HARQ1 sequentially, according to the HARQ timings K1-K2.

Figure 7:
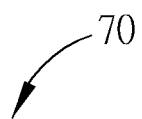
FIG. 7 is a priority table of PDSCHs according to an example of the present invention.

FIG. 7 is a priority table 70 of PDSCHs according to an example of the present invention. Four priority lists labeled by priority bits {00, 01, 10, 11} for BWPs BWP1-BWP4 are considered in the present example. For example, the priority bits {00} mean that priorities of the BWPs BWP1-BWP4 from high to low are: BWP1, BPW2, BWP3 and BWP4. For example, the priority bits {10} mean that the priorities of the BWPs BWP1-BWP4 from high to low are: BWP3, BPW1, BWP4 and BWP2. The network may transmit the priority bits with the corresponding priorities (e.g., the table 70) in a BWP configuration in a RRC message to the communication device. Then, the network may transmit a DCI command indicating which of the priority bits are used, e.g., {11}.

In one example, the priorities may be determined based on a gNB configuration. A DCI may indicate a priority of a corresponding PDSCH, e.g., {00}: the first priority, {01}: the second priority, {10}, the third priority and {11}: the fourth priority.

Figure 8:
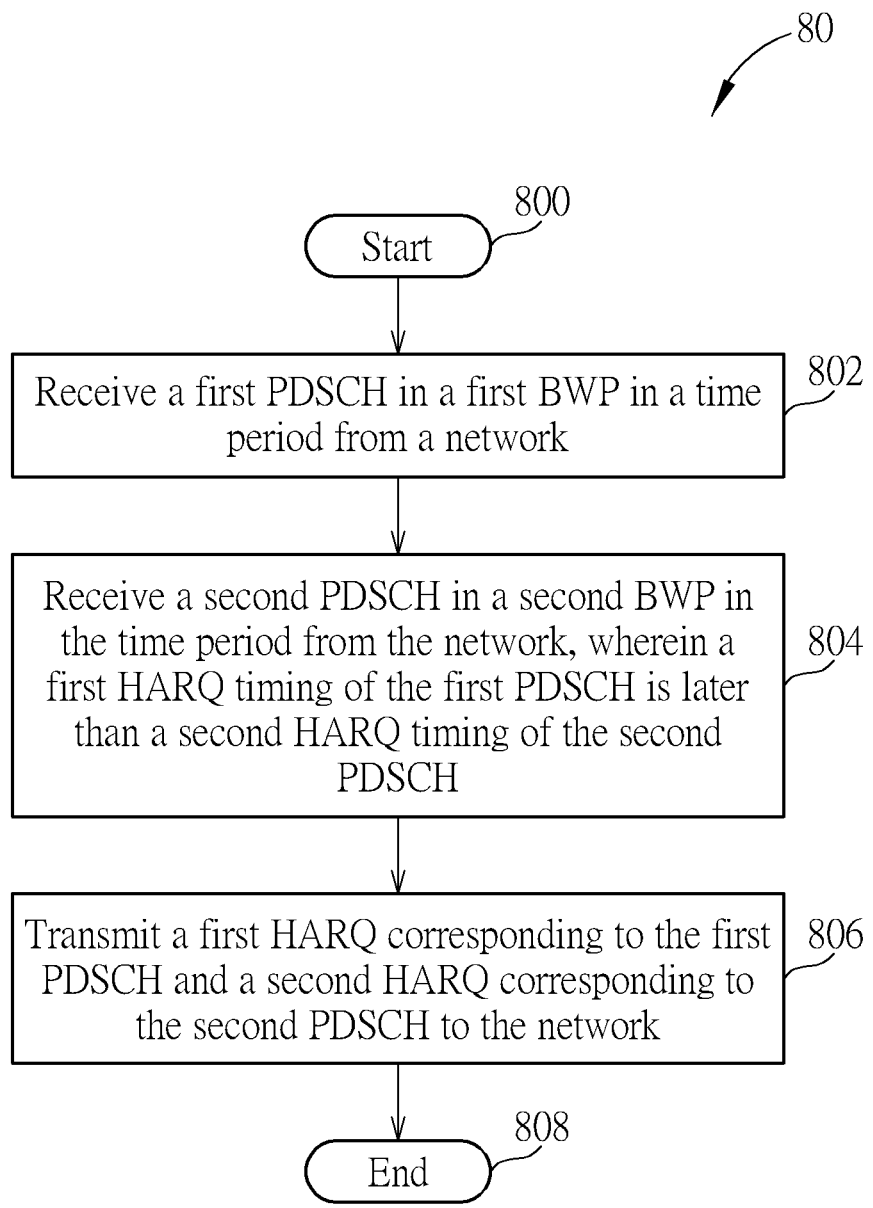
FIG. 8 is a flowchart of a process according to an example of the present invention.

FIG. 8 is a flowchart of a process 80 according to an example of the present invention. The process 80 may be utilized in a communication device, to handle a plurality of PDSCHs in a plurality of BWPs (e.g., active BWPs). The process 80 may be compiled into the program codes 214 and includes the following steps:

Step 800: Start.

Step 802: Receive a first PDSCH in a first BWP in a time period from a network.

Step 804: Receive a second PDSCH in a second BWP in the time period from the network, wherein a first HARQ timing of the first PDSCH is later than a second HARQ timing of the second PDSCH.

Step 806: Transmit a first HARQ corresponding to the first PDSCH and a second HARQ corresponding to the second PDSCH to the network.

Step 808: End.

According to the process 80, the communication device receives a first PDSCH in a first BWP in a time period from a network, and receives a second PDSCH in a second BWP in the time period from the network. A first HARQ timing of the first PDSCH is later than a second HARQ timing of the second PDSCH. Then, the communication device transmits a first HARQ corresponding to the first PDSCH and a second HARQ corresponding to the second PDSCH to the network. That is, all the HARQs are transmitted. Thus, the problem that the communication device can only handle one BWP is solved.

Realization of the process 80 is not limited to the above description. The following examples may be applied for realizing the process 80.

The first PDSCH and the second PDSCH may be transmitted in several ways. In one example, a first time interval of the first PDSCH and a second time interval of the second PDSCH are overlapped in the time period. In one example, a first time interval of the first PDSCH and a second time interval of the second PDSCH are not overlapped in the time period. For example, an ending boundary of the first time interval may locate near (e.g., the same as) a starting boundary of the second time interval. In one example, the second PDSCH is received after the first PDSCH. In one example, the first BWP and the second BWP are a same BWP.

In one example, the first HARQ may be valid or not valid (i.e., invalid) according to the following examples. In one example, the communication device determines whether the first HARQ is valid according to a UE capability of the communication device. In one example, the communication device determines that the first HARQ is valid, if the communication device is able to perform a parallel processing. In one example, the communication device determines that the first HARQ is not valid, if the communication device is not able to perform the parallel processing. Similarly, the communication device can determine whether the second HARQ is valid according to the above examples for the first HARQ, and is not narrated herein.

In one example, the communication device determines that the first HARQ is valid, if the first HARQ timing is greater than a first threshold value (and the second HARQ timing is greater than a second threshold value). In one example, the communication device determines that the first HARQ is valid, if a TBS of the first PDSCH is not greater than a threshold value. In one example, the communication device determines that the first HARQ is not valid, if the first HARQ timing is not greater than a first threshold value (and the second HARQ timing is greater than a second threshold value). In one example, the communication device determines that the first HARQ is not valid, if a TBS of the first PDSCH is greater than a threshold value. In one example, the communication device determines that the second HARQ is valid, if the second HARQ timing is greater than a second threshold value. Similarly, the communication device can determine whether the second HARQ is valid according to the above examples for the first HARQ, and is not narrated herein.

In one example, the communication device determines that one of the first HARQ and the second HARQ is valid, if a HARQ timing of the one of the first HARQ and the second HARQ is greater than a processing procedure time of the one of the first PDSCH and the second PDSCH. That is, a validity of a HARQ is determined based on whether a HARQ timing of a PDSCH is greater than a time length needed for processing the PDSCH.

Figure 9:
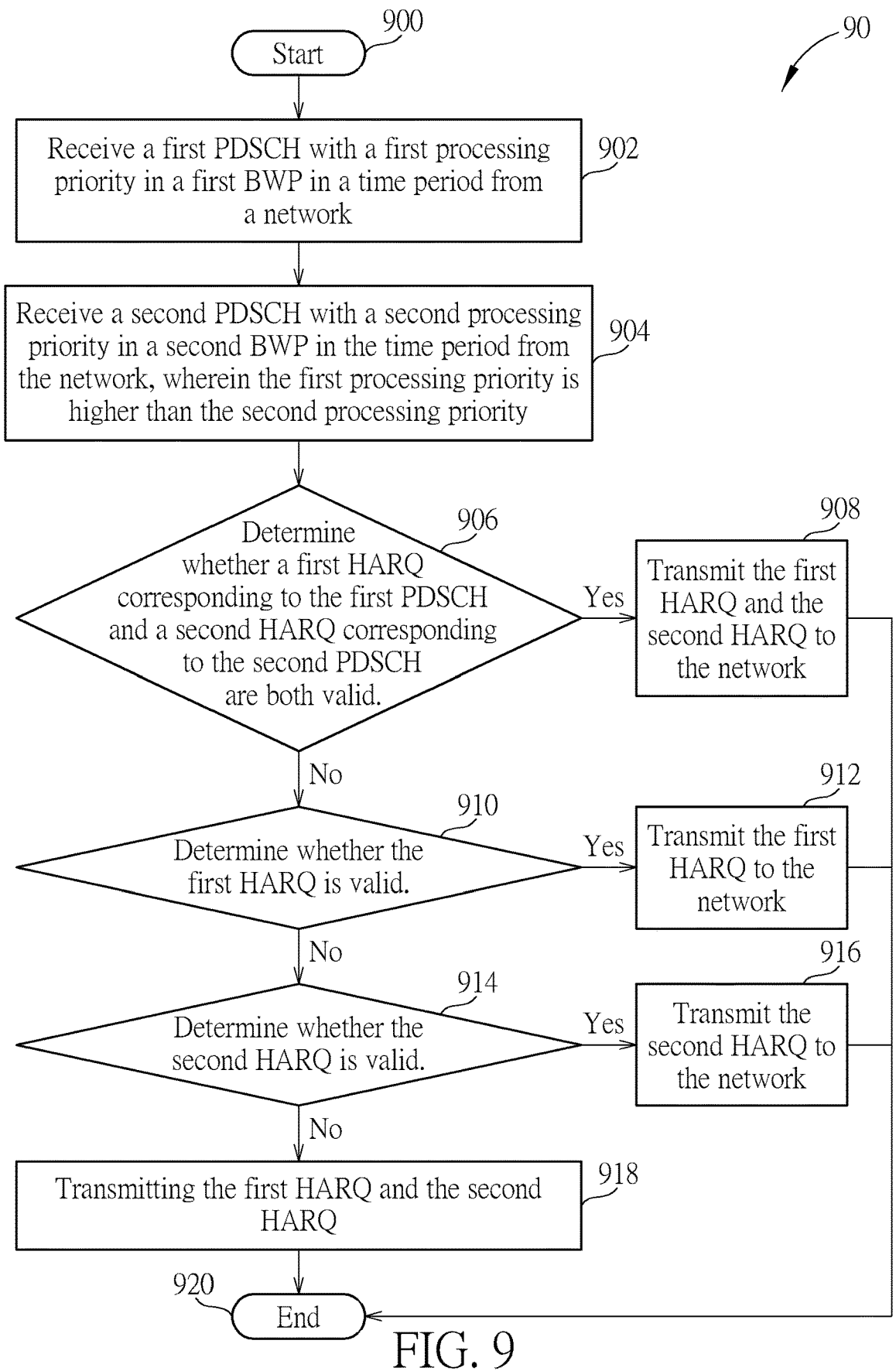
FIG. 9 is a flowchart of a process according to an example of the present invention.

Operations of the communication device in the above examples can be summarized into a process 90 shown in FIG. 9, and can be compiled into the program codes 214. The process 90 includes the following steps:

Step 900: Start.

Step 902: Receive a first PDSCH with a first processing priority in a first BWP in a time period from a network.

Step 904: Receive a second PDSCH with a second processing priority in a second BWP in the time period from the network, wherein the first processing priority is higher than the second processing priority.

Step 906: Determine whether a first HARQ corresponding to the first PDSCH and a second HARQ corresponding to the second PDSCH are both valid. If yes, perform Step 908; otherwise, go to Step 910.

Step 908: Transmit the first HARQ and the second HARQ to the network.

Step 910: Determine whether the first HARQ is valid. If yes, perform Step 912; otherwise, go to Step 914.

Step 912: Transmit the first HARQ to the network.

Step 914: Determine whether the second HARQ is valid. If yes, perform Step 916; otherwise, go to Step 918.

Step 916: Transmit the second HARQ to the network.

Step 918: Transmitting the first HARQ and the second HARQ.

Step 920: End.

Detailed operations and variations of the process 90 can be referred to the above illustration, and are not narrated herein.

The above examples may be extended to cases of multiple PDSCHs (e.g., the number of the PDSCHs is greater than 2) in multiple BWPs. In one example, in a case that the communication device configured with y active BWPs (e.g., y>1), the communication device is scheduled to receive multiple PDSCHs. A PDSCH decoding conflict between M conflicted PDSCHS of the PDSCHs may happen. The communication device may perform a PDSCH processing procedure to determine validit(ies) of HARQ(s) for PDSCH(s), and the PDSCH(s) may be determined according to the following examples.

(1) The communication device may select N PDSCHs (e.g., N=2) from the M conflicted PDSCHs according to a priority order associated with the PDSCHs or the BWPs.

(2) The communication device may randomly select N PDSCHs (e.g., N=2) from M PDSCHs.

(3) The communication device may determine whether or not to process the M PDSCHs without an interruption, e.g., based on a reception order of the M PDSCHs. If the interruption is not necessary, the communication device may process all the M PDSCHs accordingly. Otherwise, the communication device may select N PDSCHs (e.g., N=2) from the M PDSCHs according to the priority order (e.g., according to (1)) or randomly (e.g., according to (2)).

In one example, the communication device is configured with y active BWPs (e.g., y≥1), the communication device is scheduled to receive multiple PDSCHs. A PDSCH decoding conflict (e.g., M PDSCHs) may happen in a scheduled scenario. The communication device may check whether or not to provide a valid HARQ corresponding to the scheduled PDSCH, e.g., M=3 (PDSCH1, PDSCH2 and PDSCH3 with corresponding processing times and corresponding HARQ timings, associated with a priority ordering, PDSCH3>PDSCH2>PDSCH1). Validity of a HARQ for a PDSCH (e.g., a corresponding value or a threshold may be configured in each condition for comparison) may be determined according to the following steps.

(1) If M PDSCHs are determined to provide a valid HARQ with all possible orderings, e.g., PDSCH1→PDSCH2→PDSCH3, PDSCH1→PDSCH3→PDSCH2, PDSCH2→PDSCH1→PDSCH3, PDSCH2→PDSCH3→PDSCH1, PDSCH3→PDSCH1→PDSCH2, and PDSCH3→PDSCH2→PDSCH1, the communication device processes the PDSCHs based on the orderings;

(2) Else, if M−1 PDSCHs are determined to provide a valid HARQ with all possible orderings, e.g., PDSCH1→PDSCH2, PDSCH1→PDSCH3, PDSCH2→PDSCH1, PDSCH2→PDSCH3, PDSCH3→PDSCH1, and PDSCH3→PDSCH2, the communication device processes the PDSCHs based on the orderings;

(3) Else, if M−2 PDSCHs are determined to provide a valid HARQ with all possible orderings, e.g., PDSCH1, PDSCH2, PDSCH3, the communication device processes the PDSCHs based on the orderings;

(4) Else, if M−3, . . . , 1, the communication device processes the remaining PDSCHs based on the orderings;

(5) Else, the communication device does not provide any valid HARQ corresponding to the M PDSCHs, End if.

In one example, for the communication device supporting operations for multiple active BWPs, the total number of HARQ processes may be configured by the network, and these HARQ processes may be shared among the active BWPs of a serving cell. In one example, for the communication device supporting operations for multiple active BWPs, the communication device expects (e.g., is configured) to receive a unicast service (e.g., a PDSCH carrying a TB need to be acknowledged) in one of the active BWPs.

A BWP in the present invention may be defined according to the following examples. In one example, a BWP is associated with a specific numerology (e.g., subcarrier spacing or cyclic prefix (CP) type). In one example, the communication device expects (e.g., is configured with) at least one DL BWP and one UL BWP being active among a set of configured BWPs for a given time instant. In one example, the communication device is configured with at least one cell which includes at least one configured BWP per cell. An activated cell may include at least one active BWP. For example, for the activated cell, the communication device may be configured with up to x (e.g., 4) BWPs and active y (e.g., y≤x) BWPs in a same time period.

In one example, multiple BPWs with different numerologies for a cell are active for the communication device simultaneously. Each BWP may not be limited to one service type, e.g., eMBB traffic, URLLC traffic, mMTC traffic, etc. Different BWPs may not be limited to a same numerology or different numerologies. In one example, PDSCHs in different BWPs are scheduled with different starting points, and the PDSCHs may be fully overlapped, partially overlapped or not overlapped in a time domain.

The operation of "determine" described above may be replaced by the operation of "compute", "calculate", "obtain", "generate", "output, "select", "use", "choose/select" or "decide". The term of "according to" described above may be replaced by "in response to". The phrase of "associated with" described above may be replaced by "of" or "corresponding to". The term of "via" described above may be replaced by "on", "in" or "at". The term "at least one of . . . or . . . " described above may be replaced by "at least one of . . . or at least one of . . . " or "at least one selected from the group of . . . and . . . ".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a communication device and method for handling PDSCHs in BWPs. Operations to be performed by the communication device are defined. Thus, the communication device can properly process the PDSCHs. As a result, the problem regarding multiple active BWPs is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a plurality of physical downlink (DL) shared channels (PDSCHs) in a plurality of bandwidth parts (BWPs), comprising:
   at least one storage device; and
   at least one processing circuit, coupled to the at least one storage device, wherein the at least one storage device stores instructions, and the at least one processing circuit is configured to execute the instructions of:
   receiving a first PDSCH in a first BWP in a time period from a network;
   receiving a second PDSCH in a second BWP in the time period from the network;
   receiving a third PDSCH in a third BWP in the time period from the network, wherein the first PDSCH is corresponding to a first processing priority and the second PDSCH is corresponding to a second processing priority, wherein the first processing priority is higher than the second processing priority;
   determining to process the first PDSCH in response to a first hybrid automatic repeat request (HARQ) transmission timing of the first PDSCH being greater than a first threshold value and the second HARQ timing of the second PDSCH being greater than a second threshold value and to stop processing the first PDSCH in response to the first HARQ timing of the first PDSCH not greater than the first threshold value and the second HARQ timing of the second PDSCH being greater than a second threshold value; and
   processing the second PDSCH according to the second processing priority and processing the third PDSCH according to the third processing priority, wherein the first processing priority is higher than the second processing priority which is higher than the third processing priority, a first hybrid automatic repeat request (HARQ) transmission timing of the first PDSCH is later than a second HARQ transmission timing of the second PDSCH and the HARQ transmission timing of the third PDSCH is later than the HARQ timing of the second PDSCH.

2. The communication device of claim 1, wherein a first time interval of the first PDSCH and a second time interval of the second PDSCH are overlapped in the time period.

3. The communication device of claim 1, wherein a first time interval of the first PDSCH and a second time interval of the second PDSCH are not overlapped in the time period.

4. The communication device of claim 1, wherein the second PDSCH is received after the first PDSCH.

5. The communication device of claim 1, wherein the first BWP and the second BWP are a same BWP.

6. The communication device of claim 1, wherein a processing procedure time of the second PDSCH is determined according to a processing procedure time of a user equipment (UE) capability of the communication device and a non-negative timing offset.

7. The communication device of claim 1, wherein the instruction of determining whether to process the first PDSCH according to the at least one factor further comprises:
   determining whether to process the first PDSCH according to a UE capability of the communication device.

8. The communication device of claim 7, wherein the instruction of determining whether to process the first PDSCH according to the at least one factor further comprises:
  stopping processing the first PDSCH according to the UE capability, if the UE capability does not support a parallel processing.

9. The communication device of claim 1, wherein the instruction of determining whether to process the first PDSCH according to the at least one factor further comprises:
  determining whether to process the first PDSCH according to a transport block size (TBS) of the first PDSCH of the communication device.

10. The communication device of claim 9, wherein the instruction of determining whether to process the first PDSCH according to the at least one factor further comprises:
  stopping processing the first PDSCH, if the TBS of the first PDSCH is greater than a threshold value.

11. The communication device of claim 1, wherein the first processing priority and the second processing priority which has a lower priority than the first processing priority are determined according to a DL control information (DCI) command transmitted by the network.

12. A communication device for handling a plurality of physical downlink (DL) shared channels (PDSCHs) in a plurality of bandwidth parts (BWPs), comprising:
  at least one storage device; and
  at least one processing circuit, coupled to the at least one storage device, wherein the at least one storage device stores instructions, and the at least one processing circuit is configured to execute the instructions of:
    receiving a first PDSCH in a first BWP in a time period from a network;
    receiving a second PDSCH in a second BWP in the time period from the network,
    receiving a third PDSCH in a third BWP in the time period from the network,
    wherein the first PDSCH corresponds to a first processing priority which is the highest processing priority, the second PDSCH corresponds to a second processing priority which is lower than the first processing priority, and the third PDSCH corresponds to a third processing priority which is lower than the second processing priority, a first hybrid automatic repeat request (HARQ) transmission timing of the first PDSCH is later than a second HARQ transmission timing of the second PDSCH and the HARQ transmission timing of the third PDSCH is later than the HARQ timing of the second PDSCH;
    processing the first PDSCH in response to the HARQ transmission timing of the first PDSCH being greater than a first threshold value and the HARQ timing of the second PDSCH being greater than a second threshold, stop processing the first PDSCH in response to the HARQ timing of the first PDSCH being less than the first threshold value and the HARQ timing of the second PDSCH being greater than a second threshold, processing the second PDSCH according to the second processing priority, and process the third PDSCH according to the third processing priority;
    transmitting a first HARQ corresponding to the first PDSCH if the first PDSCH is processed and a second HARQ corresponding to the second PDSCH to the network and a third HARQ corresponding to the third PDSCH to the network.

13. The communication device of claim 12, wherein a first time interval of the first PDSCH and a second time interval of the second PDSCH are overlapped in the time period.

14. The communication device of claim 12, wherein a first time interval of the first PDSCH and a second time interval of the second PDSCH are not overlapped in the time period.

15. The communication device of claim 12, wherein the second PDSCH is received after the first PDSCH.

16. The communication device of claim 12, wherein the first BWP and the second BWP are a same BWP.

17. The communication device of claim 12, wherein the communication device determines whether the first HARQ is valid according to a user equipment (UE) capability of the communication device.

18. The communication device of claim 12, wherein the communication device determines that the first HARQ is valid, if the first HARQ timing is greater than a first threshold value.

19. The communication device of claim 12, wherein the communication device determines that the first HARQ is valid, if a transport block size (TBS) of the first PDSCH is not greater than a threshold value.

20. The communication device of claim 12, wherein the first HARQ is not valid.

21. The communication device of claim 12, wherein the communication device determines that the first HARQ is not valid, if the first HARQ timing is not greater than a first threshold value.

22. The communication device of claim 12, wherein the communication device determines that the first HARQ is not valid, if a TBS of the first PDSCH is greater than a threshold value.

23. The communication device of claim 12, wherein the communication device determines that the second HARQ is valid, if the second HARQ timing is greater than a second threshold value.

* * * * *